UNITED STATES PATENT OFFICE.

J. J. C. SHERIDAN, OF IRONMONGER LANE, LONDON, ENGLAND.

IMPROVEMENT IN MANAGING SACCHARINE, VINOUS, AND ACETOUS FERMENTATION.

Specification forming part of Letters Patent No. 245, dated June 30, 1837.

*To all whom it may concern:*

Be it known that I, JOHN JOSEPH CHARLES SHERIDAN, of Ironmonger Lane, in the city of London, in the Kingdom of Great Britain, have invented certain Improvements in the Several Processes of Saccharine, Vinous, and Acetous Fermentation; and I do hereby declare that the following is a full and exact description thereof:

My invention of certain improvements in the several processes—saccharine, vinous, and acetous fermentation—consists, as regards the improvements in the process of saccharine fermentation, in my method, hereinafter described, of carrying on and effecting the same process of saccharine fermentation within an air-tight vessel capable of resisting the pressure of the atmosphere, whereby during parts of the said process the same is carried on under a reduced atmospheric pressure or in a partial vacuum; and my invention, as regards the improvement in the process of vinous fermentation, consists in my method, hereinafter described, of carrying on and effecting the same process of vinous fermentation under a reduced atmospheric pressure, or in a partial vacuum, instead of carrying on and effecting the same process according to the methods now in use, whereby the materials used in such process are subjected to the ordinary pressure of the atmosphere; and my invention, as regards the improvement in the process of acetous fermentation, consists in my method of carrying on and effecting the same process of acetous fermentation, as hereinafter described, whereby I effect the carrying on of parts of the said last-mentioned process under a reduced atmospheric pressure, or in a partial vacuum, instead of carrying on and effecting the same process according to the methods now in use, whereby the materials used in such process are subjected to the ordinary pressure of the atmosphere; and, first, I proceed to describe the manner in which I have ascertained that my invention of the improvement in the process of saccharine fermentation can be best performed.

I take a vessel so constructed as to be air-tight and capable of resisting atmospheric pressure on a vacuum being formed within. I find that a vessel made of wrought or cast iron will answer the purpose best, and the vessel may be either cylindrical, square, or octagonal, or in any other form capable of sustaining the pressure described; but I prefer a cylindrical vessel made of wrought-iron plates as being better suited to resist the pressure of the atmosphere, and such cylindrical vessel I recommend to be constructed in the following manner; but other well-known modes of attaining the same end will occur to engineers or workmen who may be employed in making such vessels: The vessel should be made of cast or wrought iron plates, those plates not to be cast or wrought straight or on a level plane, but each to form a curve or arc of a circle whose radius is equal to half the diameter of the vessel, and the plates must be cast or wrought, keeping in view the directions as to man-holes pipes, &c., hereinafter mentioned. The four edges of these plates are "to lap over"—a term well known to mechanics and engineers—to the extent of three or four inches, and the thickness of these plates to be not less than half an inch throughout, except the flanges or laps, which ought to be not less than three-fourths of an inch thick. Holes are to be drilled into the flanges or laps, at a distance of from four to six inches from each other, for the admission of bolts, and these holes should not be less than three-fourths of an inch in diameter.

The first or lower tier or range of plates, forming the sides of the vessel nearest its bottom, and fastened thereto, are bolted in the form of a cylinder by means of bolts passing through the holes in the flanges or laps above described, and all the joints must be calked or made tight with iron cement. The lower flanges or laps of the second tier or range of plates are then bolted on in like manner to the top or upper flanges or laps of such first or lower tier or range of plates, and the joints must be, as before, calked or made tight with iron cement. In consequence of the junction and bolting together of the flanges or laps of the first and second tiers of plates, additional power against the pressure of the atmosphere is acquired. The third tier or range of plates is bolted to the tier immediately below it in the mode above described for bolting together the first and second tiers, and any additional tier of plates must be fastened on in like manner.

If the vessel be of the size of three thousand five hundred to four thousand cubic feet, which is the size I prefer, although the size may be varied according to circumstances, then for such dimensions the plates may be four feet by four feet exclusive of the flanges or laps, and proportionably smaller or larger for vessels of a smaller or larger size.

The bottom is formed of wrought or cast iron plates, and may be either flat or semi-spherical, and is bolted onto the lower flanges or laps of the first or lower tier or range of plates. The top is also formed of wrought or cast iron plates, and may be either flat or semi-spherical, and the same is bolted onto the upper flanges or laps of the uppermost tier or range of plates.

A coil of pipe, which I prefer should be of copper, and which should be three inches in diameter, is fixed within the vessel in the following manner: The coil should consist of six or seven rounds of pipe, and these rounds should be so disposed as to rest on the bottom of the vessel, the outer round being placed about six inches from the internal sides of the vessel. One end of the pipe so to be coiled should pass through the side of the vessel close to the junction of the side to the bottom, and should communicate with a steam-boiler, and the other end of this pipe should pass through the opposite side of the vessel close to the bottom or through the bottom, in order to discharge the condensed steam, hereinafter mentioned. In the center of the said flat or semi-spherical bottom an air-cock two inches at least in diameter is fixed. A false bottom is placed immediately above the coil of pipes, but not touching them, of the same dimensions as the inside of the said vessel, so as to fit closely into the same, which false bottom must be perforated with small holes like that of a brewer's mash-tub. These holes should not exceed one-eighth of an inch in diameter.

The false bottom should be formed of loose plates, which may be of the form of sectors of circles in a cylindrical vessel and a corresponding shape in other vessels, and the outer edges should be made to rest upon an iron rim three inches wide and fixed to the inner circumference of the vessel, but above the said coil of pipes and air-cock, as aforesaid; and such plates should be supported at their apexes or points, which form the center, on a small iron column or support fixed to the first-mentioned bottom, and about six inches in diameter, and the upper surface of which should be parallel to the said inner rim, supporting the outer edges of such loose plates. The sides of these loose plates should closely fit, so that the whole may form one complete bottom, without any intermediate spaces above the level of the said false bottom. An oval or round man-hole from six to seven square feet in area is to be formed in the side of the vessel. The lower extremity of such man-hole nearest the bottom of the vessel should be about an inch above the rim which supports the false bottom. This man-hole must have a cover or plate so constructed and ground tight as to fit on exactly and be capable of being hermetically closed and of resisting the atmospheric pressure before mentioned.

Into the flat or semi-spherical top a pipe four inches in diameter, which I call the "exhausting-pipe," is to be fixed air-tight, communicating with a double-actioned single or double barrel air-pump about one foot six inches in diameter and about two feet stroke, which is worked by a steam-engine or other sufficient power. A mercurial pressure-gage to ascertain the degree of rarefaction within the vessel and two or more thermometers to ascertain the degree of heat within the vessel at different depths must be screwed air-tight into the top of the vessel. The size of this air-pump must be proportionate to the size of the vessel, so as to be able to produce a vacuum to the extent of about twenty-eight of mercury. A man-hole of similar size and shape to the one at the bottom of the vessel is made or cut out in its top, and must be likewise fitted with a cover or plate so constructed and ground tight as to fit on exactly and be capable of being hermetically closed and of resisting the atmospheric pressure.

The grain which it is intended to subject to the process of saccharine fermentation is thrown through the man-hole in the top of the vessel onto the false bottom, and water is then let in upon it in the usual way of steeping. The grain is allowed to remain in the water for the requisite time, according to the judgment of the maltster as exercised in the ordinary process, till the steeping is complete, which time will vary from forty to sixty-five hours. After the steeping has been carried on a sufficient time the water is allowed to run off by the air-cock in the bottom before mentioned. The man-hole in the top, which had been opened for the admission of the grain, is now hermetically closed. The grain is then allowed to remain in the vessel from twenty-six to thirty hours, when it will have attained the temperature of from 60° to 65° Fahrenheit. Should the grain during this part of the process exceed or have a tendency to exceed this temperature, the air-pump must be set to work (in manner hereinafter more particularly described) and continued to work until the temperature of the grain becomes reduced and stationary at not exceeding 65° of Fahrenheit. This part of the process produces the same effects as what is known among maltsters by the name of "couching."

The operations equivalent to flooring are commenced by setting the air-pump to work for six hours, or until the vacuum in the vessel is equal to twenty inches of mercury on the gage, which is the state of rarefaction to be maintained inside of the vessel. By these and the other means hereinafter stated the temperature of the grain ought to be reduced as nearly as possible to 45° Fahrenheit, but not lower, at which temperature, or within a few degrees thereof, it ought to be kept for about twenty-four hours. After the lapse of that period, during the continuation of the malting, up to the period of drying, the temperature must be as near to 50° Fahrenheit as possible.

To keep down the heat to the degrees of temperature desired, in addition to the action of the air-pump I adopt the folllowing means when requisite: I fix a tube or pipe two inches in diameter to the air-cock already described, fixed in the lower bottom of the vessel. The other end of this tube or pipe is fixed into the top of a small square or cylindrical iron tank, the size of which may be about six feet deep and six feet in diameter or square. This vessel is to be filled with cold water. Another tube or pipe six inches in diameter is fixed in the top of the tank and is open at both ends. The upper end of this latter pipe is fixed by a collar or flange to the head of the tank and communicates with the external air, and the lower end thereof is made to plunge into the vessel within six inces from the bottom. With the exception of these two tubes or pipes, the tank should be hermetically closed, a partial vacuum having been formed inside of the vessel containing the grain. By means of the action of the air-pump the atmospheric air rushing in at the external orifice of the tube or pipe last described is drawn up through the cold water and passes into the vessel through the brass air-cock, which has been opened for the purpose. The air in the vessel is thus reduced to a lower temperature, and is also purified; and the passing of such air through the body of the grain to the air-pump reduces the temperature of the grain to the degrees required. In cold weather, when the temperature in the vessel containing the grain may have a tendency to fall below 45° and 50°, respectively before mentioned, either steam may be introduced into the coil of pipe aforesaid, by which means a certain proportion of heat is evolved, which is disseminated through the body of the grain by the action of the air-pump, or the temperature may be increased by allowing warm air at 100° Fahrenheit to enter through a tube or pipe to be affixed to the aforesaid brass air-cock, or to another similar brass air-cock fixed in the bottom of the vessel; and be drawn through the body of the grain by the action of the air-pump. Such are the means I use for regulating the temperature. The continuation of the process is carried on as follows:

In order to supply the germinating grain with moisture, I allow a current of air which has passed through the water in the tank, and which has absorbed a proportion of moisture, to find its way, in the manner before described, into the vessel containing the grain, and which air is drawn through the body of the grain by the action of the air-pump. Another object in making use of this current of air is to carry off the carbonic acid gas which may be generated during the process of germination, and to supply atmospheric air to assist in that process, and for this object the air-pump should be put in action for about ten minutes about once in every six hours, although the state of the temperature should not require it according to the directions above given.

As another mode of moistening or sprinkling the grain when it may be necessary, I adopt the following means: The rose of a watering-pot is fixed in the center of the top of the malting-vessel, with the rose downward, and which rose should be about a foot in diameter, and the holes therein should be about the thirty-second part of an inch in diameter. The upper part or pipe to the rose should be about two inches, and connected with a water-cistern elevated at least ten feet above the top of the malting-vessel.

The pipe must be fitted with a cock which will keep the malting-vessel air-tight, and the water is introduced by opening this cock and keeping it open a sufficient time to supply the grain with the necessary quantity of moisture; and in order to disseminate the moisture through the whole body of the grain, I make use of the air-pumps in the following manner: Between the false bottom and the lower bottom of the malting-vessel I affix a pipe of about three inches in diameter into the side of the vessel, communicating with the air-pumps, and provided with a stop-cock to shut off all communication when necessary with the air-pumps. Immediately after the water has been allowed to descend through the rose on the grain I shut off, by means of a stop-cock, the communication between the air-pumps and the pipe inserted into the top of the vessel, and I open the stop-cock of the pipe inserted into the side of the vessel, and having put the air-pumps into action, the exhaustion of the air from the bottom of the vessel causes the water to descend from the top through the grain, and so much of the water as shall have fallen to the bottom is allowed to escape through the air-cock in the bottom of the malting-vessel before described, when the process of germination is completed, which may be judged of by the maltster, on his examining the grain, by opening the man-hole in the top of the vessel, which should be occasionally done,—that is, about every twenty-four hours. It is then necessary to proceed to drying the malt. For this purpose steam is introduced into the coil of pipe until the temperature of the whole body of the grain has attained 120°. The vacuum is then raised to a point from fifteen to twenty-five inches on the mercury-gage and the moisture of the grain is expelled in the course of two days or less, after which the malt is discharged through the lower man-hole, and my process is then complete. The moisture evaporated from the grain during the process of drying is to be condensed previous to its being drawn into the air-pump. This may be effected either by a condenser capable of condensing about one hundred and fifty gallons of water per hour, which condenser is affixed between the malting vessel and the air-pump to the pipe, which establishes a communication between them, or by the usual method of condensation by allowing the necessary proportions of cold water to run through the pipe from the vessel to the air-pump.

If any other than a cylindrical-shaped vessel is used, and to which I have confined my description because I prefer a vessel of that shape, great care must be taken in its construction, so that it may be properly secured against the pressure of the atmosphere, and it will be required to be fitted up with all the requisites of the before-mentioned cylindrical vessel.

And as regards that part of my invention which consists in improvements in the process of vinous fermentations, I describe the same as follows—that is to say:

The vinous fermentation, or that process by which saccharine substances in solution are converted into vinous liquid containing a certain proportion of spirit or alcohol, is also carried on by me in an air-tight vessel capable of resisting, when exhausted, the incumbent pressure of the atmosphere.

I take a vessel called a "back," of the size and dimensions hereinbefore described, and in the head of such vessel I fix a pipe about four inches in diameter, which I call the "exhaustion-pipe," communicating as before and with a condenser, and then with the air-pump, and also fix on the bottom of the vessel, and passing from side to side thereof in manner before described, a coil of steam-pipe communicating with a steam-boiler. A plug is fixed in the bottom of the vessel to discharge the "wash"—a term well known to distillers—and a man-hole is made in the top of the vessel. No false bottom is necessary here nor any man-hole in the side.

A mercurial gage is fixed on the head of the vessel to ascertain the internal pressure, and a thermometer dipping half-way into the wash is screwed air-tight into the head of the back, with the scale outside of the same.

On the external circumference of the back, and opposite to each other, two vertical pipes five inches in diameter are fixed, with elbow-flanges to the bottom of the back and inserted into the same, so as to communicate with the inside of the same. These pipes ascend to about two feet above the head of the back. The upper orifices of these pipes are hermetically closed by caps screwed on the same, and in the center of each of these caps an air-valve opening inward is fixed. Weights are suspended from beams attached to the valves, so that on the same being lifted the atmosphere enters the pipes. Into each side of the back, about the spot or point up to which the wash is originally poured or filled up to, pipes, also five inches in diameter, are fixed, communicating with the inside of the back, so as to allow the escape through them of the head or froth of the wash in manner hereinafter mentioned. These latter pipes are fixed with flanges to the corresponding exterior vertical pipes before mentioned, and running into the same. The improved process of vinous fermentation is performed in this back as follows: The vessel called a "back" is filled from about two-thirds to three-fourths full with worts of the usual gravities. All the yeast intended to be used is either added at once or only a portion of it and the rest afterward, as the distiller thinks proper.

The heat of the worts when set should be about 70° in the winter and a few degrees lower in the summer, with such variation as the state and temperature of the atmosphere in the usual way require, all which is well known to distillers. The wash enters into fermentation and is left to continue fermenting spontaneously for about eight to ten hours. The back is now hermetically closed, and the air-pump is set to work and continued at a vacuum of fifteen inches for the first twenty-four hours and about twenty inches from the expiration of those twenty-four hours until the end of the process. The pressure is regulated by a small valve on the pipe communicating with the air-pump or in the head of the back, with weights to it, so as to admit the atmosphere whenever a vacuum exceeding the limits last before mentioned is created inside of the back. When the wash in the back has entered into fermentation the head or froth upon the wash, which consists chiefly of yeast and the purest parts of the same, rises, and in the present method, in consequence of the continual discharge of carbonic-acid gas, this head or froth is continually kept on the surface of the liquid, where its effects are useless; but in my process the superabundant yeast finds its way into the five-inch pipes in the sides of the vessel, and by lifting for five or six minutes the weights attached to the valves in the caps of the vertical pipes once every four hours the pressure of the air on rushing in suddenly propels the yeast to the bottom of the back, where it mixes again and acts upon the wash. The opening of these valves for these short periods admits at the same time a certain proportion of atmospheric air, which is indispensable. When the fermentation has proceeded about twenty-four hours the temperature of the back is by means of steam carefully injected through the coil of pipe at the bottom of the vessel, raised gradually during the space of six or eight hours to 110° Fahrenheit, at which heat by the same means it is kept till the process is completed. At this temperature and below it the spirits or alcohol generated during the fermentation carried on, as before described, in a partial vacuum separate from the wash, and are vaporized as they are formed, and escaping by the exhaustion-pipe are signified by means of the condenser attached to such pipe, as before mentioned. The temperature may even be raised to 130° Fahrenheit; but in that case the heat must not be communicated altogether by steam-pipes in immediate contact with the wash, but partially by steam-pipes, as before mentioned, which ought not be allowed to produce of themselves a greater heat than 110° of Fahrenheit, and that heat gradually only and partially by heating the room in which the fermentation is being carried on to 130° Fahrenheit. The alcohol or spirit thus condensed is allowed to run from the condenser into the ordinary receivers or vats.

As regards that part of my invention which consists in improvements in the process of acetous fermentation, I describe the same as follows—that is to say: The acetous fermentation, or that process by which vinous or spirituous liquids are converted into acetic acid or vinegar, is also carried on by me in air-tight metal vessels, as are above described; but the inside of such vessels must contain wooden vessels of about one inch and a half thick fitted tightly to the internal circumference of such metal vessels by means of cement. These vessels must have tops or heads, and these tops must be made of similar metal, with wooden tops or heads cemented to and within such metal heads. The wooden parts of the vessels I make use of in order to keep the vinegar-wash from coming in contact with the metal, which would spoil the vinegar. I use these vessels or backs in pairs. A condenser is placed between the two and connected with each other by pipes. This condenser must be made either of pure tin or of pure tin mixed with one-tenth of copper. A coil of pipe formed of the same metal for the introduction of steam lies on the bottom of each back and passing through each from side to side. A coil of pipe formed of the same metal perforated with small holes of the diameter of the thirtieth part of an inch lies also on the bottom of each back. Each back has a tin pipe four inches in diameter fixed in the head, which communicates with an air-pump, and such last-mentioned pipe is fitted with a stop-cock, and has also a tin pipe of four inches in diameter fixed to the top and plunging through the top of the other back into the middle of it to within six inches of the bottom, and by these latter pipes a communication is established between the two vats or backs. The improved process of acetous fermentations is performed in these backs or vessels as follows:

I fill the same backs or vessels with "wash"— a term well known to vinegar-makers—to the extent of three-fourths of each vessel. The temperature of one of the vats is increased to 115° Fahrenheit by means of the injection of steam through the coil of pipe not perforated. The air-pump is set to work at a vacuum of twenty inches of mercury, and an air-cock fixed outside of the vessel to the perforated coil is then opened. Air previously raised to the temperature of 115° is admitted through the air-cock. The cock ought to be opened at such bores as will admit the air in a state of rarefaction sufficiently high not to reduce the vacuum below twenty inches. The action of the pump throws the warm rarefied air from the bottom through the body of the wash.

From the surface of the wash in the vat, which has been heated to 150°, the air and a portion of the alcohol of the same vat ascend through the pipe already described and plunging into the vat which has been kept cold, the alcohol is condensed in the liquid, and the air thus freed from the alcohol is drawn off through the air-pump. The consequence of the action of the pump is that the wash in the heated vat loses its spirits, which is known to prevent the progress of the acetous fermentations, and by impoverishing the said wash renders it more apt to turn acid. The effect of the hot rarefied air is to cause absorption of the oxygen to take place. The motion occasioned by the regular admission of air through the small holes in the coil places the whole of the wash in constant contact with the atmospheric air, which is indispensable for the purposes of acidification. When the air-pump has thus been worked for about twelve hours the vat previously heated is left to cool for four or five hours, and the second vessel is raised to the temperature of 115° Fahrenheit by the means already mentioned, and the air-pump being set to exhaust from the vessel previously heated but now cooled, the alcohol and air, admitted as before, pass through the plunging-tube through the body of the wash. The air leaves the spirit behind, impoverishes the wash in the heated vessel, and promotes acidification, so that by alternately abstracting the alcohol from one vessel to another, and by the application of the warm air and motion under a reduced pressure of the atmosphere, the acetous fermentation is completed in a much shorter time.

Now I do not claim any of the articles above mentioned separately, such as the vessels, vats, backs, pipes, tubes, cocks, &c., or the mode of putting them together; but

I claim—

The said processes of saccharine, vinous, and acetous fermentation as carried on under a reduced atmospheric pressure or in a partial vacuum, as above described.

J. J. C. SHERIDAN.

Witnesses:
 CHAS. EDWD. CUTTEN,
 JAMES ROBINSON,
*Both of No. 29 Ironmonger Lane, in the city of London.*